US012578042B2

(12) United States Patent
Kesler et al.

(10) Patent No.: US 12,578,042 B2
(45) Date of Patent: Mar. 17, 2026

(54) METAL SEAL FITTING WITH TIGHT BEND TECHNOLOGY

(71) Applicant: Hanon Systems, Daejeon (KR)

(72) Inventors: Eric Kesler, Northville, MI (US);
Radek Macicek, Senov u Noveho
Jicina (CZ); Pavel Segeta, Stary Jicin
(CZ); Zdenek Vahalik, Suchdol nad
Odrou (CZ); Pavel Pitel, Verovice
(CZ); Radim Cech, Studenka (CZ);
Carl Cordy, Belleville, MI (US);
Michael G. Theodore, Jr., Plymouth,
MI (US); Raquel Estrada, Dearborn,
MI (US); Salvador Guadalajara, Cd.
Juarez Chihuahua (MX); **Patricia
Flynn, El Paso, TX (US); Augustin
Machynak**, Senov u Noveho Jicina
(CZ)

(73) Assignee: HANON SYSTEMS, Daejeon (KR)

( * ) Notice: Subject to any disclaimer, the term of this
patent is extended or adjusted under 35
U.S.C. 154(b) by 598 days.

(21) Appl. No.: 16/401,577

(22) Filed: May 2, 2019

(65) Prior Publication Data

US 2020/0200307 A1     Jun. 25, 2020

Related U.S. Application Data

(60) Provisional application No. 62/783,763, filed on Dec.
21, 2018.

(51) Int. Cl.
*F16L 23/028*      (2006.01)
*F16L 15/00*       (2006.01)
(52) U.S. Cl.
CPC ......... *F16L 23/0283* (2013.01); *F16L 15/008*
(2013.01)

(58) Field of Classification Search
CPC . F16L 23/0283; F16L 23/0286; F16L 15/008;
F16L 23/18; F16L 23/16; F16L 41/086
(Continued)

(56) References Cited

U.S. PATENT DOCUMENTS 5,625,948 A  *  5/1997  Kuroda
5,853,201 A     12/1998  Izumi et al.
(Continued)

FOREIGN PATENT DOCUMENTS

DE        1043731 B    11/1958
EP        2365260 A2    9/2011
(Continued)

OTHER PUBLICATIONS

Wikipedia; Chamfer; 5 pages; https://en.wikipedia.org/wiki/
Chamfer.

*Primary Examiner* — Illiam S. Choi
(74) *Attorney, Agent, or Firm* — Shumaker, Loop &
Kendrick, LLP; James D. Miller

(57)          ABSTRACT

A block fitting assembly comprises a first block having a first
opening formed therethrough, a sealing element, and a tube.
The tube includes a linearly extending first segment extend-
ing through the first opening of the first block and a linearly
extending second segment arranged at an angle relative to
the first segment. A bend portion of the tube connects the
first segment to the second segment. An end portion of the
first segment of the tube forms a seal engaging surface of the
tube for engaging the sealing element. The end portion of the
first segment of the tube further defines at least a portion of
the projecting portion of the first block configured for
reception in a recess of a corresponding second block.

1 Claim, 8 Drawing Sheets

(58) Field of Classification Search
USPC .................................. 285/368, 179, 412, 413
See application file for complete search history.

(56)                    References Cited

U.S. PATENT DOCUMENTS

| | | | | |
|---|---|---|---|---|
| 7,007,981 | B2 * | 3/2006 | Yoshino ................ | F16L 41/086 |
| 7,415,765 | B2 * | 8/2008 | Ozawa .................. | F16L 41/086 |
| 7,621,568 | B2 | 11/2009 | Schroeder et al. | |
| 8,141,911 | B2 * | 3/2012 | Cho .................... | F16L 23/0283 |
| | | | | 285/179 |
| 9,261,194 | B2 | 2/2016 | Kesler et al. | |
| 2006/0244261 | A1 * | 11/2006 | Shah ................... | F16L 23/0283 |
| 2010/0237615 | A1 | 9/2010 | Cho et al. | |
| 2012/0223519 | A1 | 9/2012 | Yamamoto | |
| 2015/0115603 | A1 * | 4/2015 | Trombley ............... | F16L 23/18 |
| | | | | 285/368 |

FOREIGN PATENT DOCUMENTS

| | | | |
|---|---|---|---|
| JP | S5104284 | A1 | 2/1976 |
| JP | 2002130561 | A | 5/2002 |
| JP | 2004169797 | A | 6/2004 |
| JP | 2011106607 | A | 6/2011 |
| KR | 20100134499 | A | 12/2010 |
| WO | WO-2015056764 | A1 * | 4/2015 |

* cited by examiner

METAL SEAL FITTING WITH TIGHT BEND TECHNOLOGY

CROSS-REFERENCE TO RELATED APPLICATIONS

This patent application claims priority to U.S. Provisional Patent Application Ser. No. 62/783,763, filed on Dec. 21, 2018, the entire disclosure of which is hereby incorporated herein by reference.

FIELD OF THE INVENTION

The invention relates generally to an apparatus for connecting fluid lines, and particularly, to an apparatus for connecting fluid lines wherein one of the corresponding fluid lines includes a first linear portion arranged at an angle relative to a second linear portion thereof.

BACKGROUND OF THE INVENTION

The components of a fluid system are typically joined to each other by fluid lines extending between the components. The connection of each fluid line to each respective component introduces additional points at which a fluid carried by the fluid line may leak out of the refrigerant circuit or at which exterior contaminants may undesirably be introduced into the refrigerant. The lack of a suitable seal at each fluid line connection may lead to damage to the components forming the refrigerant circuit or may reduce an operating efficiency of the refrigerant circuit.

Such fluid line connections are commonly formed between a male seal fitting block (hereinafter "the male block") and a cooperating female seal fitting block (hereinafter "the female block") forming a block fitting assembly. The male block and the female block may each be associated with one of a pair of components configured to communicate a fluid therethrough. The male block includes a projecting portion and the female block includes a recessed portion configured to receive the projecting portion. The projecting portion and the recessed portion include aligned flow paths that communicate the fluid therebetween, wherein one or both of the aligned flow paths may further receive a tubing segment therein associated with one of the associated components. A primary sealing element is typically compressed between the projecting portion and the recessed portion to prevent the leakage of the fluid from the aligned flow paths and/or tubing segments. The male and female blocks typically include aligned fastener openings for receiving a fastener therethrough, such as a threaded stud configured to mate with a threaded nut, with the aligned fastener openings formed at a central region of each of the blocks adjacent the respective projecting portion or recessed portion thereof.

One potential issue arises when the two components in need of coupling are arranged at an angle relative to each other. Such a block fitting assembly may include a pair of the fluid flow paths arranged at an angle of greater than 0 degrees relative to each other. The angled relationship between the two flow paths may result in a portion of the block fitting assembly where the flow paths meet having a complex contour with sharp corners and drastic changes in direction for the fluid flowing therethrough. Such a configuration results in the fluid experiencing an increased pressure drop in comparison to an aligned set of the flow paths devoid of such an angled relationship while also significantly increasing the cost and complexity of forming such a fluid connection.

Additional shortcomings of such prior art block fitting assemblies may include limiting a size of the fastener used to couple the cooperating block fittings, limiting a total package size of the completed block fitting assembly, limiting a range of potential temperatures at which the block fitting assembly may be subjected, or limiting a pressure of the fluid passing through the block fitting assembly.

It would therefore be desirable to form a seal fitting assembly with improved sealing capabilities and the ability to couple two components arranged at an angle to each other while reducing the cost and complexity of the manufacture thereof.

SUMMARY OF THE INVENTION

Compatible and attuned with the present invention, an improved block seal fitting assembly has surprisingly been discovered.

In one embodiment of the invention, a block seal fitting assembly comprises a first block having a first opening formed therethrough, a sealing element, and a tube including a first segment extending through the first opening of the first block and a second segment arranged at an angle relative to the first segment. An end portion of the first segment forms a seal engaging surface of the tube for engaging the sealing element.

A method of manufacturing a block seal fitting assembly is also disclosed. The method comprises the steps of: bending a tube to form a first segment and a second segment, the first segment arranged at an angle relative to the second segment; inserting the first segment of the tube into an opening formed in a block fitting; and forming an end portion of the first segment of the tube into a seal engaging surface.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings of which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
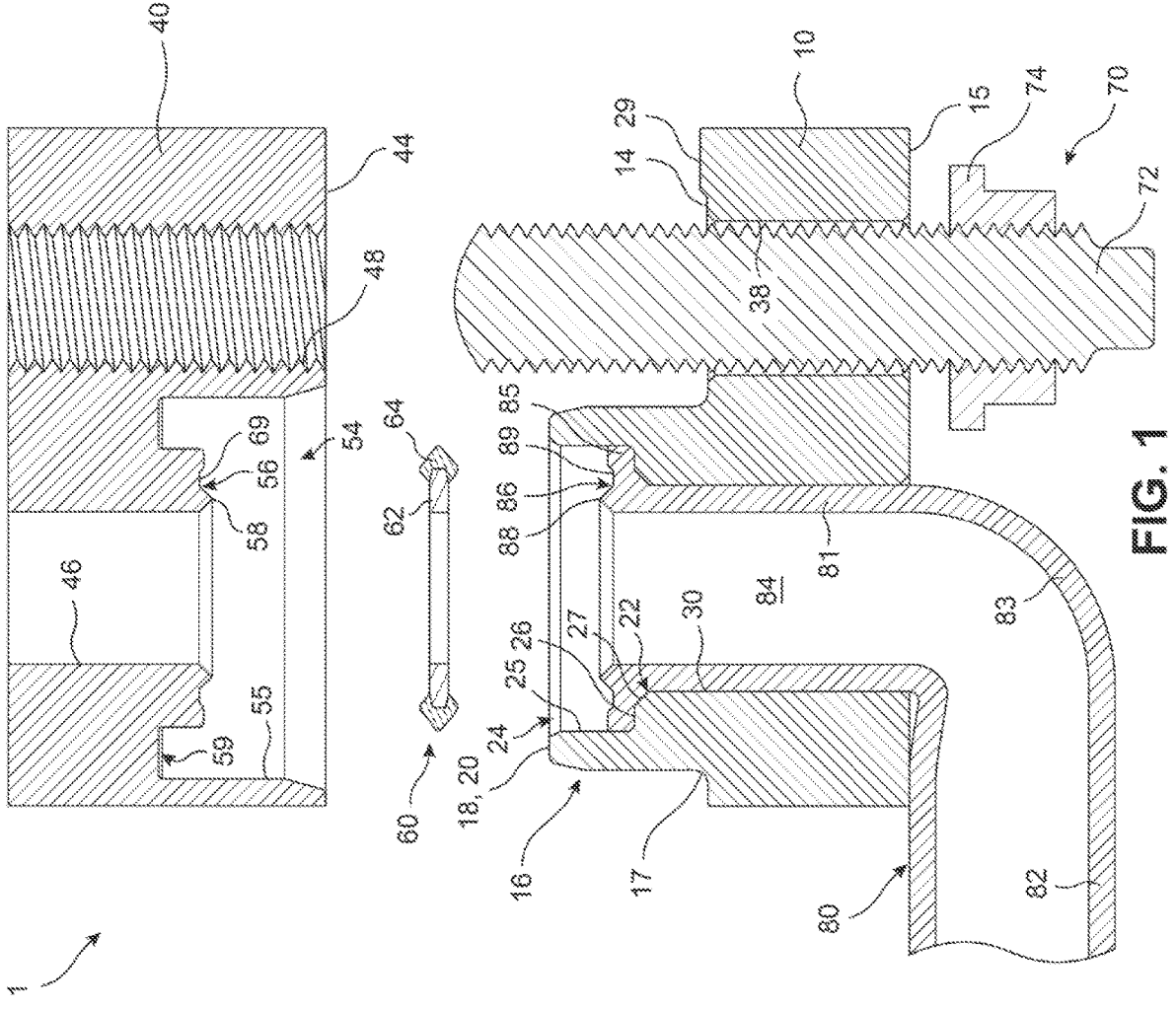
FIG. 1 is an exploded cross-sectional elevational view of a block seal fitting assembly according to an embodiment of the present invention.

FIG. 1 illustrates a block seal fitting assembly 1 according to an embodiment of the present invention, which is hereinafter referred to as the block assembly 1 for brevity. The block assembly 1 may be used to couple two different components to each other wherein a fluid associated with the two components enters or exits one of the components with a different flow orientation than when the fluid enters or exits the other of the components. In all cases, the two components may be any two components associated with any type of fluid conveying system, such as an HVAC system, a cooling system, a hydrogen fuel cell system, a steering system, or a braking system of a motor vehicle, as non-limiting examples. The block assembly 1 may be subjected to any type of fluid, including glycol, water, ethanol, methanol, gasoline, diesel, jet fuel, various types of refrigerants or coolants, or combinations thereof, as non-limiting examples.

The block assembly 1 includes a first block 10, a second block 40, a sealing element 60, a fastener assembly 70, and a tube 80. As shown, the first block 10 forms a male component and the second block 40 forms a female component of the block assembly 1. The first block 10 and the second block 40 are each formed of a rigid material. The rigid material may be a metallic material such as aluminum, steel, and alloys thereof. The tube 80 may be formed from the same materials suitable for forming the blocks 10, 40. In some embodiments, each of the blocks 10, 40 and the tube 80 are formed from a common material, as desired.

The first block 10 includes a main body having a substantially planar first mating face 14 and a projecting portion 16 extending substantially perpendicularly from the first mating face 14. The projecting portion 16 may include a substantially cylindrical outer surface, but other configurations of the outer surface of the projecting 16 may also be utilized such as a hexagonal outer surface configuration, as desired. The projecting portion 16 includes a first end 17 intersecting the first mating face 14 and a second end 18 spaced from the first mating face 14 in an axial direction of the projecting portion 16. The second end 18 of the projecting portion 16 defines a piloting feature 20 of the first block 10 in the form of a peripherally extending rim of the projecting portion 16. The piloting feature 20 may be inwardly tapered to more easily guide the projecting portion 16 into a corresponding portion of the second block 40, as explained hereinbelow.

The piloting feature 20 circumscribes a substantially cylindrical first recess 24 formed in the projecting portion 16. The first recess 24 extends in the axial direction of the projecting portion 16 from the second end 18 thereof toward the first end 17 thereof. The first recess 24 is defined by an inner circumferential surface 25 and a radially extending surface 26 of the projecting portion 16. The inner circumferential surface 25 extends in the axial direction of the boss 16 from the second end 18 thereof to a position intermediate the first end 17 and the second end 18 thereof, but alternative depths of the first recess 24 may be used without departing from the scope of the present invention.

The radially extending surface 26 extends radially inwardly from the inner circumferential surface 25 towards a first opening 30 of the first block 10. The first opening 30 is cylindrical in shape and formed concentrically with respect to the first recess 24 of the projecting portion 16. The first opening 30 also extends in the axial direction of the projecting portion 16, which is perpendicular to the first mating face 14 of the first block 10. The first opening 30 extends through an entirety of the first block 10 and is configured to receive the tube 80 therein. The radially extending surface 26 and a surface defining the first opening 30 accordingly form an annular shoulder 22 spaced radially inwardly from the inner circumferential surface 25 of the projecting portion 16. The shoulder 22 may further include a chamfer 27 forming a frustoconical surface for connecting the radially extending surface 26 to the surface of the main body defining the first opening 30, as desired.

The first block 10 further includes a first fastener aperture 38 and a leverage feature 29. The first fastener aperture 38 extends through the first block 10 and is spaced laterally from and arranged parallel to the first opening 30. The first fastener aperture 38 may be substantially cylindrical in shape and may be configured to receive a threaded fastener 72 of the fastener assembly 70. The leverage feature 29 may be formed at an end of the first mating face 14 adjacent the first fastener aperture 38. The leverage feature 29 may take the form of a fulcrum extending away from the first mating face 14 in the axial direction of the first fastener aperture 38. The leverage feature 29 may be substantially heel-like in appearance as the leverage feature 29 extends away from the first mating face 14 of the first block 10.

The tube 80 includes a first segment 81, a second segment 82, and a bend portion 83 connecting the first segment 81 to the second segment 82. A flow opening 84 extends through each of the first segment 81, the bend portion 83, and the second segment 82. The first segment 81 is substantially cylindrical in shape and extends linearly in the axial direction of the first opening 30 while the second segment 82 is substantially cylindrical in shape and extends linearly in a direction arranged at an angle greater than 0 degrees and equal to or less than 90 degrees relative to the axial direction of the first opening 30 and the first segment 81. The angle formed between the first segment 81 and the second segment 82 is hereinafter referred to as the lift angle of the tube 80. The flow opening 84 includes a substantially circular or elliptical cross-sectional shape along a length of the tube 80 to minimize a drop in pressure of the fluid when traversing the tube 80.

FIG. 1 illustrates the lift angle present between the first segment 81 and the second segment 82 as being about 90 degrees with the second segment 82 extending in a direction away from the fastener assembly 70 of the block assembly 1. However, as shown in FIGS. 2 and 3, the second segment 82 may have any number of possible orientations relative to the first segment 81 so long as the second segment 82 does not interfere with a portion of the block assembly 1 such as the threaded fastener 72 or a secondary component disposed adjacent the block assembly 1.

Figures 2, 3:
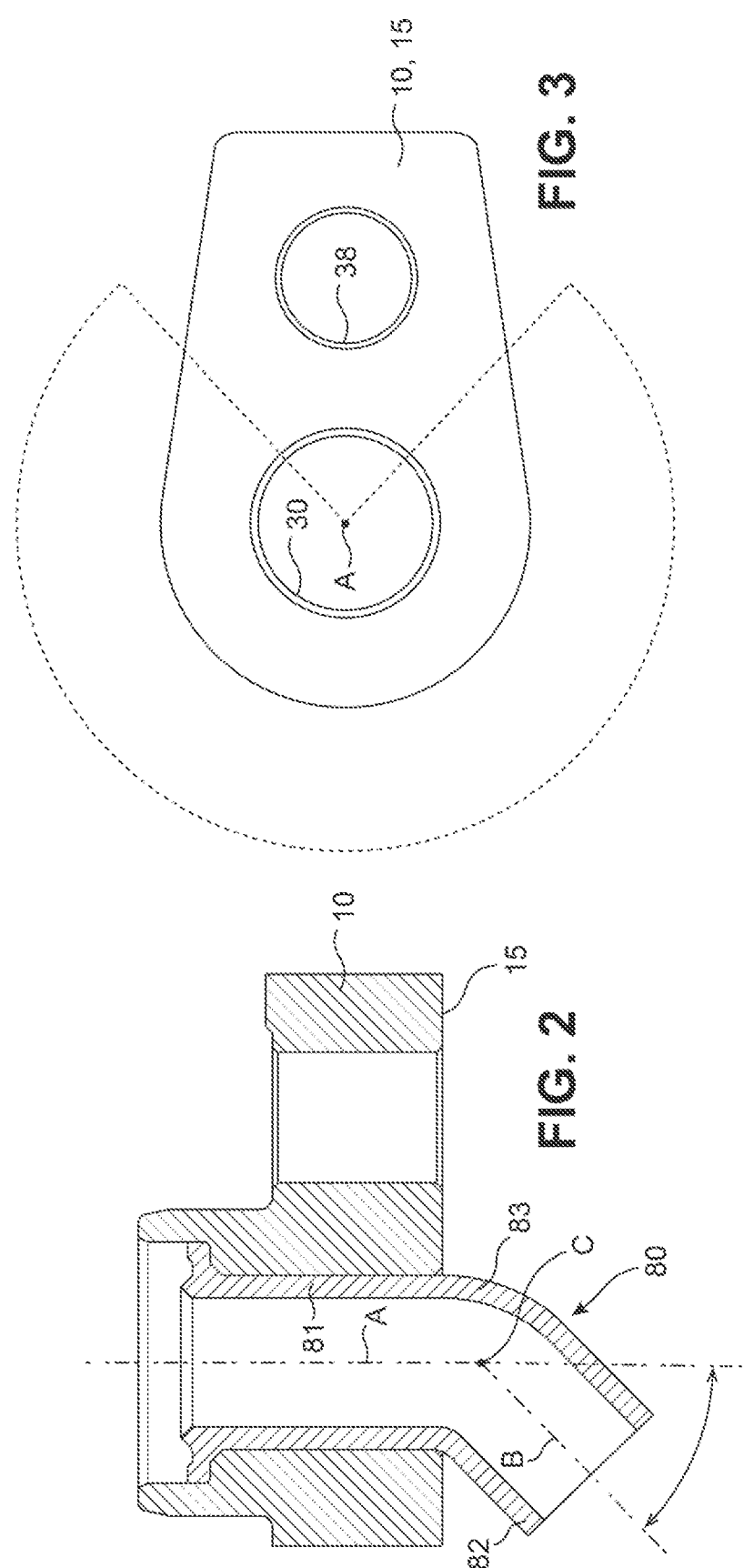
FIG. 2 is a cross-sectional elevational view illustrating a lift angle of a first segment of a tube relative to a second segment of the tube when the first segment of the tube is received within a first block.
FIG. 3 is a bottom plan view of the first block illustrating a range of angular orientations for the second segment of the tube relative to the first segment of the tube.

For example, FIG. 2 illustrates an alternative lift angle of about 45 degrees present between the first segment 81 and the second segment 82 while also showing a generalized relationship between the first segment 81, the second segment 82, and the bend portion 83 of the tube 80. Regardless of the selected lift angle, a central axis A of the first segment 81 always intersects a central axis B of the second segment 82 at a point C disposed within the bend portion 83 of the tube 80. The point C is further disposed exterior to the first opening 30 of the first block 10 and spaced from an outer face 15 of the first block 10 formed opposite the mating face 14 with respect to the axial direction of the first opening 30. The bend portion 83 also extends arcuately when connecting the first segment 81 to the second segment 82. A centerline radius of curvature of the tube 80 along the bend portion 83 is preferably substantially constant when the centerline radius of curvature connects the central axis A to the central axis B to reduce the drop in pressure of the fluid traversing the flow opening 84. The radius of curvature of the tube 80 along the bend portion 83 thereof is also preferably minimized in order to form a tight bend in the tube 80 for reducing the packaging space occupied by the tube 80 while still forming the bend portion 83 in the tube 80 at a position exterior to the first opening 30. For example, the bend portion 83 of the tube 80 in FIG. 1 includes a minimized radius of curvature in order to minimize an extent to which the second segment 82 projects away from the first block 10 in the axial direction of the first opening 30, which in turn minimizes a profile of the entire block assembly 1 in the axial direction of the first opening 30, while requiring no modification of the structure of the first opening 30 to accommodate the reception of the tube 80 therein.

FIG. 3 shows that the second segment 82 may also have a plurality of different angular orientations relative to the central axis A of the first segment 81 in addition to that shown in FIG. 1. For example, the dashed line in FIG. 3 bounds a range of potential angular orientations of the second segment 82 relative to the central axis A of the first segment 81 for a given lift angle, such as the 90 degree lift angle shown in FIG. 1, while preventing interference between the second segment 82 and the threaded fastener 72 when the threaded fastener 72 is disposed in the first fastener aperture 38 of the first block 10. As should be understood by one skilled in the art, a reduction in the lift angle will result in a greater range of potential angular orientations of the second segment 82 relative to the first segment 81 when the reduction in lift angle reorients the second segment 82 in a manner preventing interference with the threaded fastener 72.

The tube 80 is shown as including only the two segments 81, 82, but the tube 80 may include additional bends within a portion of the tube 80 extending away from the second segment 82 in order to fluidly couple the block assembly 1 to an adjacent component of the associated fluid system while accommodating the available packaging space provided by the associated fluid system. The remainder of the tube 80 not shown throughout the figures may accordingly include substantially any configuration suitable for communicating a fluid therethrough without departing from the scope of the present invention.

Referring back to FIG. 1, the first segment 81 extends longitudinally from a seal engaging portion 85 of the tube 80 disposed within the recess 24 of the projecting portion 16 to the bend portion 83 thereof. The seal engaging portion 85 is formed by an end portion of the tube 80 extending radially outwardly to cause the seal engaging portion 85 to be an outwardly extending flange of the tube 80. An underside of the seal engaging portion 85 engages and conforms in shape to shoulder 22 and the inner circumferential surface 25 of the projecting portion 16 to prevent the existence of any gaps at the joint therebetween.

The seal engaging portion 85 of the tube 80 forms a first seal engaging surface 86 having at least one engaging feature 88 formed intermediate the inner circumferential surface 25 and the first opening 30 of the projecting portion 16. The engaging feature 88 extends annularly adjacent the first opening 30 and is configured to sealingly engage the sealing element 60. The engaging feature 88 forms an axially extending projection or rib configured to impart a localized compressive stress on a portion of the sealing element 60 disposed within the first recess 24.

The engaging feature 88 is shown in FIG. 1 as having a substantially V-shaped cross-sectional shape including a pointed edge formed at a distal end of the engaging feature 88. The edge may be formed by a pair of tapering surfaces arranged at an angle relative to each other. A sharpness of the edge of the engaging feature 88 may be selected to impart a desired degree of compressive stress to the portion of the sealing element 60. In some embodiments, an angle formed between the cooperating surfaces forming the pointed edge may be selected to be at least 60 degrees and less than 90 degrees. In other embodiments, the angle may be greater than 90 degrees and less than or equal to 120 degrees. One skilled in the art should appreciate that alternative configurations of the engaging feature 88 may be used without departing from the scope of the present invention so long as the engaging feature 88 is suitable for delivering the desired localized compressive stress to the portion of the sealing element 60 disposed within the first recess 24.

The first seal engaging surface 86 further includes at least one cavity 89 formed therein.

The at least one cavity 89 forms a depression in the first seal engaging surface 86 indented in a direction opposing the direction of extension of each of the engaging features 88 projecting from the first seal engaging surface 86. FIG. 1 illustrates the first seal engaging surface 86 as including a single annular cavity 89 formed adjacent and radially outwardly of the engaging feature 88. The cavity 89 is shown as having a substantially trapezoidal cross-sectional shape, but other shapes may be used without departing from the scope of the present invention. For example, the cavity 89 may have a semi-circular shape, a tapered triangular shape with a relatively small radius of curvature at a distal end thereof, a tapered triangular shape with a relatively large radius of curvature at a distal end thereof, or an oblique angled shape, as non-limiting examples. The cavity 89 is configured to receive at least a portion of the sealing element 60 therein during compression of the sealing element 60 between the first block 10 and the second block 40.

The first seal engaging surface 86 may include any number of the engaging features 88 and any number of the cavities 89, as desired. In some embodiments, the first seal engaging surface 86 includes a plurality of the engaging features 88 interposed in alternating fashion between each of the cavities 89, as desired. Any suitable configuration of the engaging features 88 and the cavities 89 may be used without departing from the scope of the present invention.

The second block 40 includes a main body having a substantially planar second mating face 44. The main body includes a second recess 54 indented axially from the second mating face 44 in a direction perpendicular thereto. The second recess 54 includes an axially extending inner circumferential surface 55 having an inner diameter substantially equal to and slightly greater than an outer diameter of the projecting portion 16 of the first block 10 and a second seal engaging surface 56 extending radially inwardly from the inner circumferential surface 55. An axially extending annular groove 59 is formed at the intersection of the inner circumferential surface 55 and the second seal engaging surface 56. The annular groove 59 is configured to receive the piloting feature 20 of the first block 10 therein.

The second seal engaging surface 56 extends radially inwardly from the annular groove 59 and terminates at a second opening 46 of the second block 40. The second opening 46 is cylindrical in shape and formed concentrically relative to the annularly extending second recess 54. The second opening 46 extends in the axial direction of the second recess 54 which is perpendicular to the second mating face 44 of the second block 40. The second opening 46 extends through the second block 40 and is configured to convey the fluid therethrough. The second opening 46 may be configured to receive or otherwise engage a length of tubing or the like (not shown). Alternatively, the second block 40 may form a portion of a component of the associated fluid system and the second opening 46 may communicate the fluid directly to an operational portion of the component, as desired. The second opening 46 of the second block 40 is placed in concentric alignment with the first opening 30 of the first block 10 when the blocks 10, 40 are coupled to each other via the fastener assembly 70.

The second seal engaging surface 56 includes an engaging feature 58 formed intermediate the inner circumferential surface 55 and the second opening 46. The engaging feature 58 extends annularly adjacent the second opening 46 and is configured to sealingly engage at least a portion of the sealing element 60. The engaging feature 58 forms an axially extending projection or rib configured to impart a localized compressive stress on the portion of the sealing element 60 disposed within the recess 54.

The engaging feature 58 is shown in FIG. 1 as having a substantially V-shaped cross-sectional shape including a pointed edge formed at a distal end of the engaging feature 58. The edge may be formed by a pair of tapering surfaces arranged at an angle relative to each other. A sharpness of the edge of the engaging feature 58 may be selected to impart a desired degree of compressive stress to the portion of the sealing element 60. An angle formed between the cooperating surfaces may be selected to match the angle formed between the surfaces of the engaging feature 88 of the tube 80. One skilled in the art should appreciate that alternative configurations of the engaging feature 58 may be used without departing from the scope of the present invention so long as the engaging feature 58 is suitable for delivering the desired localized compressive stress to the portion of the sealing element 60 disposed within the second recess 54.

The second seal engaging surface 56 further includes at least one cavity 69 formed therein. The at least one cavity 69 forms a depression in the second seal engaging surface 56 indented in a direction opposing the direction of projection of each of the engaging features 58 of the second sealing surface 56. FIG. 1 illustrates the second seal engaging surface 56 as including a single annularly extending cavity 69 formed adjacent and outboard of the engaging feature 58. The cavity 69 is shown as having a substantially trapezoidal cross-sectional shape, but other shapes such as those described with reference to the cavity 89 of the tube 80 may also be used without departing from the scope of the present invention. The cavity 69 is configured to receive at least a portion of the sealing element 60 therein as is explained in greater detail hereinbelow.

The second seal engaging surface 56 may include any number of the engaging features 58 and any number of the cavities 69, as desired. In some embodiments, the second seal engaging surface 56 includes a plurality of the engaging features 58 interposed in alternating fashion between each of the cavities 69. The engaging features 58 and the cavities 69 may be selected to in each case be in radial alignment with corresponding ones of the engaging features 88 and the cavities 89 of the tube 80, as desired. Any suitable configuration of the engaging features 58 and the cavities 69 may be used without departing from the scope of the present invention.

The second block 40 further includes a second fastener aperture 48 spaced apart from and arranged in parallel to the second opening 46. The second fastener aperture 48 is substantially cylindrical in shape and may include a threaded inner surface configured to cooperate with the threads formed on the corresponding threaded fastener 72. As should be understood, the second fastening aperture 48 of the second block 40 is positioned in concentric alignment with the first fastening aperture 38 of the first block 10 during assembly of the block assembly 1.

The sealing element 60 includes a first seal portion 62 and a second seal portion 64. The first seal portion 62 is a substantially flat annular ring having a substantially rectangular cross-sectional shape. In the embodiment shown, the first seal portion 62 is produced from a metallic material such as aluminum, copper, or alloys thereof. The first seal portion 62 may be further coated with pure tin or tin allowed with copper, nickel, cobalt, zinc, indium, lead, or antimony, as non-limiting examples.

The second seal portion 64 extends radially outwardly from the outer peripheral edge of the first seal portion 62. An annular channel is formed in a radial inner portion of the second seal portion 64 to receive the outer edge of the first seal portion 62. The second seal portion 64 is fastened to the first seal portion 62 by any conventional fastening means such as vulcanizing, heat welding, press fitting, an adhesive, or a mechanical means of attachment, for example. In the embodiment shown, the second seal portion 64 is produced from an elastomer. It is understood that the second seal portion 64 may be produced from any conventional material such as nylon, viton, neoprene, PEEK, NBR, HNBR, EPDM, and PTFE, and related series thereof, as non-limiting examples.

The fastener assembly 70 includes the threaded fastener 72 and a nut 74. The threaded fastener 72 includes an outer surface having threads configured for engagement with the internally threaded surface of the second fastener aperture 48. The threaded fastener 72 may be a threaded stud as shown in FIG. 1. Alternatively, the threaded fastener 72 may be a bolt including a head configured to engage an outer face of one of the blocks 10, 40. The nut 74 is internally threaded and configured to engage the external threads of the threaded fastener 72.

Figure 4:
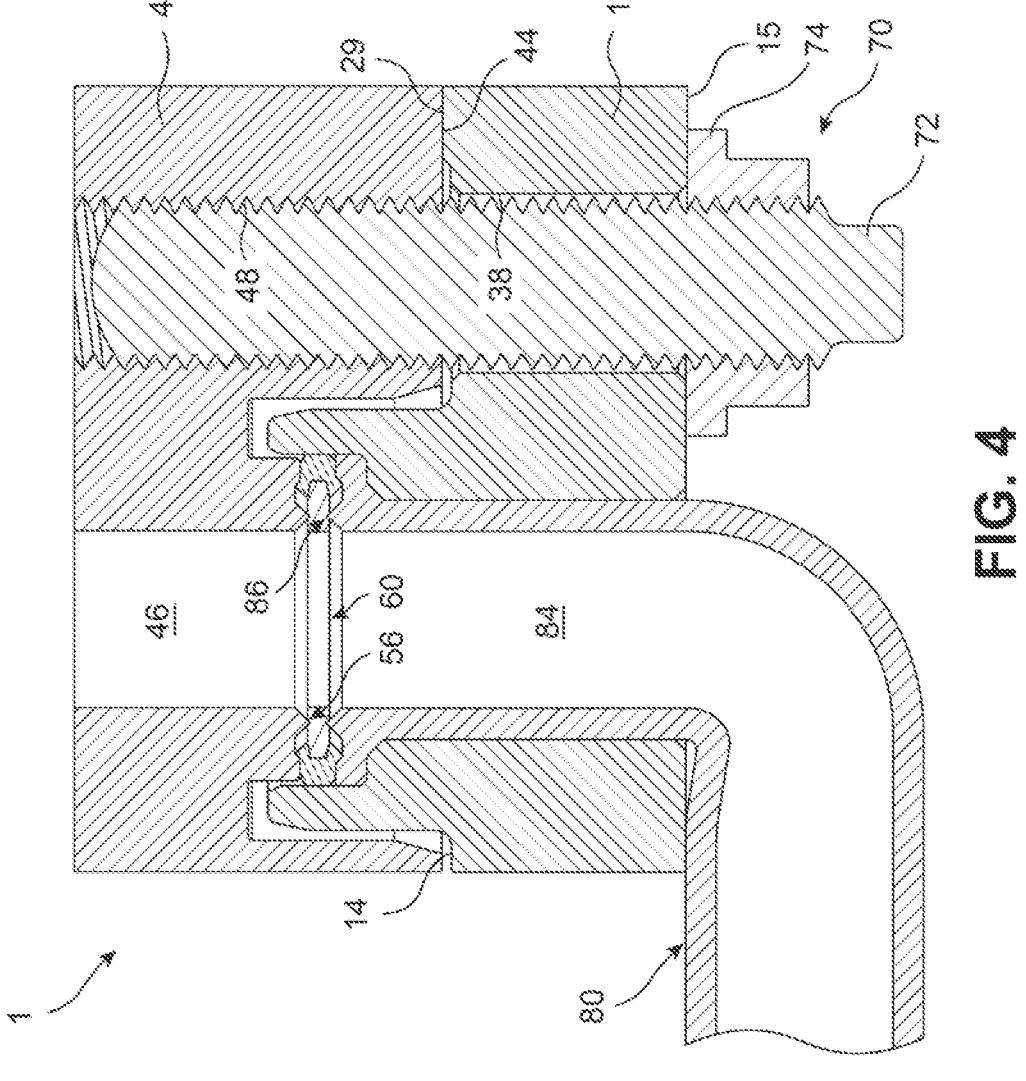
FIG. 4 is a cross-sectional elevational view of the block seal fitting assembly of FIG. 1 when the first block and a second block are coupled to each other to compress a sealing element therebetween.

As shown in FIG. 4, the fastener assembly 70 is configured to urge the first block 10 towards the second block 40 to compress the sealing element 60 between the seal engaging surfaces 56, 86, thereby sealing a flow path formed by the cooperation of the tube 80 and the second opening 46 of the second block 10. First, the threaded fastener 72 is threaded into engagement with the internal threads of the second fastener aperture 48. Next, the nut 74 is rotated relative to the threaded fastener 72 to cause the nut 74 to move axially along the threaded fastener 72 until the nut 74 engages the outer face 15 of the first block 10. Continued rotation of the nut 74 causes a spacing present between the first mating face 14 of the first block 10 and the second mating face 44 of the second block 40 to decrease until the leverage feature 29 of the first block 10 contacts the second mating face 44 of the second block 40. The sealing element 60 is simultaneously compressed to a suitable degree between the first seal engaging surface 86 of the tube 80 and the second seal engaging surface 56 formed by the second block 40. However, one skilled in the art should appreciate that any form of clamping feature suitable for urging the first block 10 towards the second block 40 in the manner described may be used without departing from the scope of the present invention.

FIGS. 5-8 illustrate a method of manufacturing the block assembly 1, and more specifically, the steps required for forming the tube 80, coupling the tube 80 to the first block 10, and forming the end portion of the first segment 81 of the tube 80 into the seal engaging portion 85 thereof The tube 80 may originally be presented as a length of cylindrical tubing having a substantially constant inner diameter and outer diameter, as desired. The tube 80 is then bent using any conventional bending process or apparatus to divide the tube 80 into the first segment 81, the second segment 82, and the bend portion 83. The lift angle present between the first segment 81 and the second segment 82 may be selected in order to accommodate the packaging arrangement of the components adjacent the block assembly 1.

Figure 5:
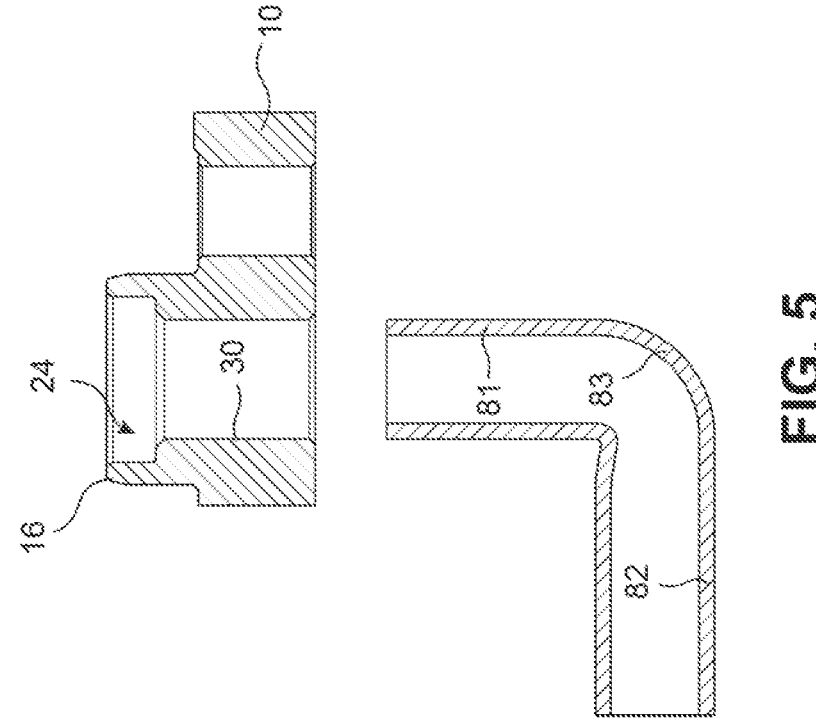
FIG. 5 is an exploded cross-sectional elevational view showing a tube following a bending thereof and prior to reception within the first block.

Once bent to the configuration of FIG. 5, the first segment 81 of the tube 80 is received through the first opening 30 to cause an end portion of the first segment 81 to extend outside of the first opening 30 and into the first recess 24 formed by the projecting portion 16. The second segment 82 may form a stopping feature for establishing an extent of axial insertion of the first segment 81 in the first opening 30 when the second segment 82 contacts the outer face 15 of the first block 10. Alternatively, as explained in greater detail hereinafter, the first segment 81 or the bend portion 83 of the tube 80 may be further deformed to provide the stopping feature for establishing the extent of axial insertion of the first segment 81 within the first opening 30 without departing from the scope of the present invention.

Figure 6:
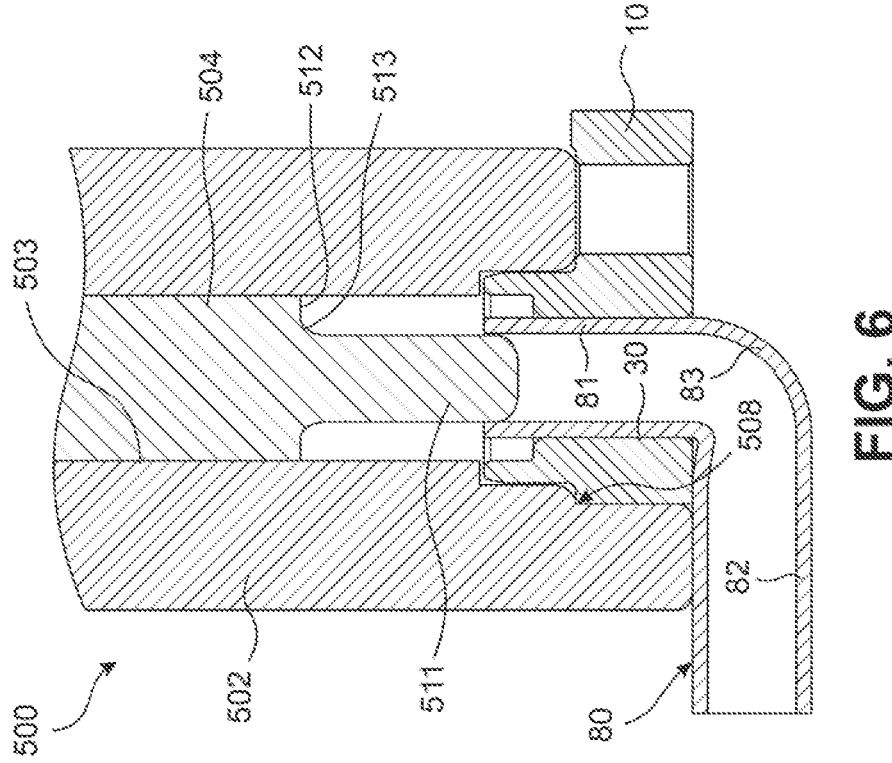
FIG. 6 is a cross-sectional elevational view illustrating a tube end forming apparatus suitable for performing a first deforming step on an end portion of the tube.

Following reception of the first segment 81 in the first opening 30 as shown in FIG. 6, the end portion of the first segment 81 extending outside of the first opening 30 is then deformed radially outwardly to form an outwardly extending flange of the first segment 81. The outward deformation of the end portion of the first segment 81 may require multiple deformation steps. For example, FIGS. 6 and 7 show two independent deforming steps for forming the end portion of the first segment 81 into the shape and configuration shown in FIG. 8.

The deforming steps may be performed using a tube end forming apparatus as is known in the art, such as a ram type apparatus including a tool configured for axial reception into or around the end portion of a corresponding tube, wherein a "ramming" of the tool into or around the corresponding tube causes the deformation of the tube.

Figure 7:
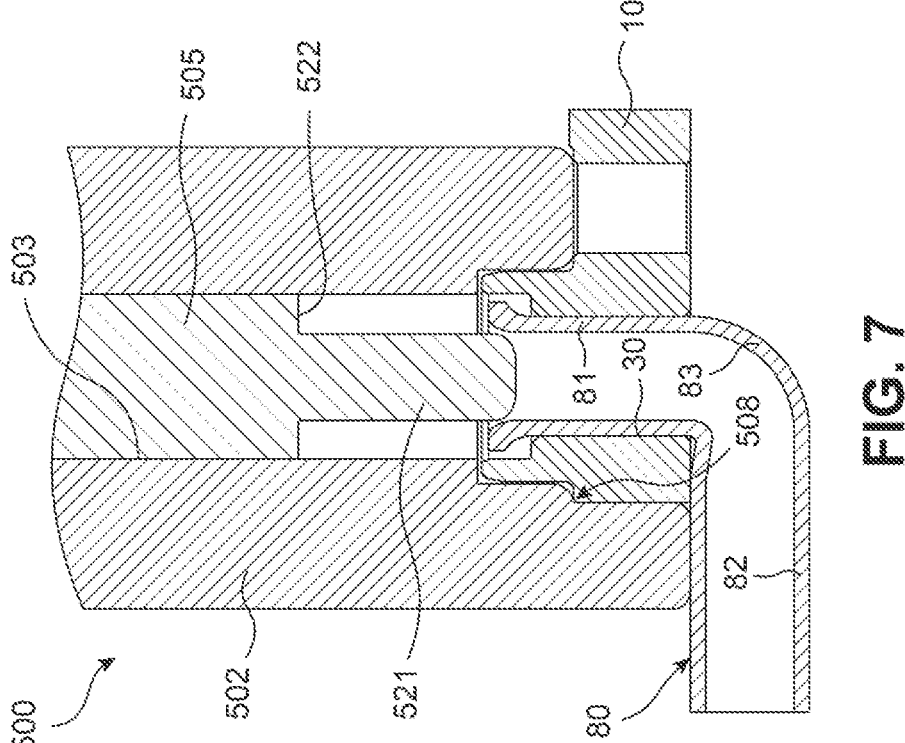
FIG. 7 is a cross-sectional elevational view illustrating a second deforming step performed on the end portion of the tube.

FIGS. 6 and 7 illustrate one exemplary tube end forming apparatus 500 suitable for performing the desired deformation of the end portion of the first segment 81. The apparatus 500 includes a holding structure 502 and one of a pair of ram tools 504, 505. FIG. 6 illustrates a first ram tool 504 suitable for performing the first deforming step while FIG. 7 illustrates a second ram tool 505 having a different structure for performing the second deforming step.

The holding structure 502 extends annularly and includes an axially extending tool opening 503 configured to slidably receive either of the ram tools 504, 505. A drive mechanism (not shown) of the apparatus 500 causes the corresponding ram tool 504, 505 to selectively reciprocate within the tool opening 503. The drive mechanism also applies an axial force to the corresponding ram tool 504, 505 suitable for deforming the rigid material forming the tube 80. The holding structure 502 further includes a block opening 508 at an end thereof having a shape and size corresponding to an outer surface of the first block 10. A surface of the holding structure 502 defining the block opening 508 accordingly engages the first block 10 and maintains a position and configuration of the first block 10 during each of the aforementioned deforming steps.

The first ram tool 504 includes a cylindrical and axially extending stem 511, an annular and radially extending surface 512 adjacent an end of the stem 511, and an annular and arcuate surface 513 connecting the stem 511 to the radially extending surface 512. As shown by a comparison of FIG. 6 to FIG. 7, the shape of the first ram tool 504 results in the end portion of the first segment 81 being flared radially outwardly in accordance with the shape of the first ram tool 504 when the first ram tool 504 is axially inserted into the first segment 81.

The second ram tool 505 includes a cylindrical and axially extending stem 521 and an annular and radially extending surface 522 extending radially outwardly from a base of the stem 521. As can be seen by comparison of FIG. 7 to FIG. 8, the shape of the second ram tool 505 results in the end portion of the first segment 81 being further deformed radially outwardly to cause the end portion of the first segment 81 to conform in shape to the corresponding portions of the outer surface of the first block 10 while an axial end of the first segment 81 is arranged substantially planar and perpendicular to the axial direction of the first segment 81.

Figure 8:
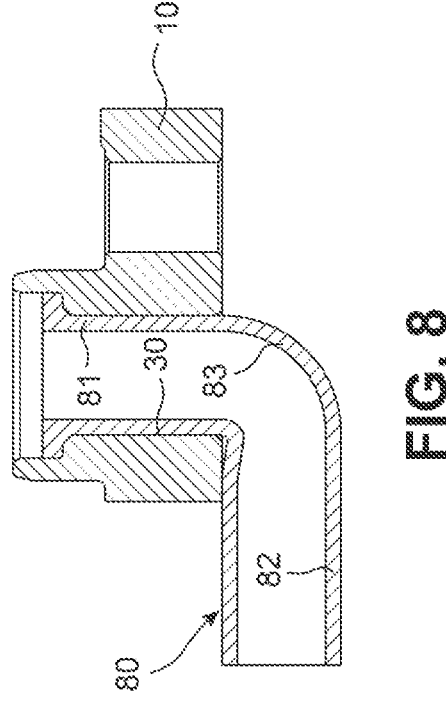
FIG. 8 is a cross-sectional elevational view illustrating the first block and the tube following the first and second deforming steps of FIGS. 6 and 7.

Once formed into the configuration shown in FIG. 8, the end portion of the first segment 81 may be further machined to form the configuration of the seal engaging surface 86 shown in FIG. 1. The machining may include a suitable cutting process for forming the annularly extending engaging features 88 or cavities 89 of the seal engaging surface 86 via removal of the material forming the tube 80, such as a suitable milling process. However, other machining processes may be used without necessarily departing from the scope of the present invention.

The tube 80 is prevented from axial removal from the first opening 30 due to the presence of the seal engaging portion 85 at one end thereof and the second segment 82 at the opposing end thereof. However, the tube 80 may be further coupled to the first block 10 to prevent relative motion therebetween and to further prevent any leakage between the tube 80 and the surface of the first block 10 defining the first opening 30.

In some embodiments, the tube 80 may be formed to have an interference fit or press fit relationship when received in the first opening 30 of the first block 10, thereby removing the need for a secondary coupling method such as an aggressive metal jointing process. A diametral clearance present between the surface defining the first opening 30 and an outer surface of the first segment 81 of the tube 80 may be at least 0.01 mm and no more than 0.35 mm. Such a joint formed between the tube 80 and the first block 10 may also be formed to be devoid of fluoride, as desired.

In other embodiments, the tube 80 may be brazed or welded to the first block 10 at the surface defining the first opening 30 with a clearance formed therebetween. A diametral clearance present between the surface defining the first opening 30 and the outer surface of the first segment 81 of the tube 80 for receiving the braze material or the welded material may be at least 0.2 mm and no greater than 0.75 mm. If welding is used, the welding may be any one of laser welding, sonic welding, vibration welding, friction welding, or GMAW welding, as desired.

In yet other embodiments, the tube 80 may be secured to the first block 10 at the first opening 30 via a suitable adhesive. The adhesive could be an epoxy or a two-part epoxy. The adhesive may be UV cured, heat-cured, light-cured, or anaerobic cured. A diametral clearance present between the surface defining the first opening 30 and the outer surface of the first segment 81 of the tube 80 for receiving the adhesive may be at least 0.2 mm and no greater than 0.75 mm. The adhesive may also include a durometer providing a dampening function between the tube 80 and the first block 10, as desired.

In other embodiments, the first segment 81 of the tube 80 and the first opening 30 of the first block 10 may include cooperating threads that facilitate the passing of the first segment 81 through the first opening 30 via rotation of the tube 80 relative to the first block 10. The threads may be any type of threading including ACME, SAE, DIN, or Whitworth, as non-limiting examples. The thread pitch may be greater than or equal to 0.5 mm and less than or equal to 3.0 mm. The threaded joint may further include one of the adhesives described above.

In still other embodiments, the tube 80 and the first block 10 may include knurled surfaces placed in engagement with each other when the first segment 81 is received within the first opening 30. The knurled surfaces prevent movement of the tube 80 relative to the first block 10 as a result of the frictional forces generated by the knurled surfaces when placed in engagement with each other. The knurled surfaces may further include an adhesive at the joint therebetween, as desired.

The tube 80 may further be "ballized" according to any of the joining methods described above. The ballized joint process may upset the tube material in order to secure additional features to the tube 80 such as a charge port or a sensor stem, as desired.

The tube 80 may have an outer diameter between 6.0 mm and 110 mm and a wall thickness greater than or equal to 0.8 mm. A centerline bend radius of the tube 80 along the bend portion 83 thereof may be greater than or equal to 3.0 mm and less than or equal to 55 mm. A ratio of a length of the tube 80 relative to the outer diameter thereof may be equal to or greater than 8 and less than or equal to 600 when a refrigerant is conveyed through the tube 80. In contrast, a ratio of a length of the tube 80 relative to the outer diameter thereof may be equal to or greater than 1.3 and less than or equal to 600 when a gaseous fluid is conveyed through the tube 80. The tube 80 may be formed to include a Reynolds number for the fluid passing therethrough equal to or greater than 5 and equal to or less than 800,000. The tube 80 may be formed to include a pressure loss of the fluid of less than 10 mbar at 20 g/sec of air.

Although not pictured by the steps shown in FIGS. 5-8, the axially extending length of the first segment 81 configured for reception within the first opening 30 may be further deformed or otherwise modified prior to or following the reception of the first segment 81 within the first opening 30. The deforming of the first segment 81 prior to reception within the first opening 30 may be provided in order to form a locating or stopping feature of the first segment 81 for establishing an axial position of the first segment 81 relative to the first opening 30 when received therein. The locating or stopping feature may be in the form of an annularly extending and radially outwardly extending rib or bead formed in the outer surface of the tube 80 configured to engage the outer face 15 of the first block 10 when the first segment 81 is axially inserted into the first opening 30. Alternatively, the first segment 81 may be expanded, contracted, tapered, or otherwise radially deformed in any desired manner in order to establish a desired cross-section or wall thickness of the first segment 81 for directing flow therethrough while the structure of the tube 80 remains complimentary to the structure of the first block 10. One skilled in the art will appreciate that various different mechanisms and processes may be utilized for forming the desired cross-sectional shape along the length of the first segment 81 including mechanisms and processes similar to those described herein.

The first segment 81 may also be deformed while disposed within the first opening 30 in order to deform the first segment 81 relative to the surface defining the first opening 30. For example, a tool similar to the tools 504, 505 may be inserted axially into the flow opening 84 of the tube 80 in order to expand the tube 80 radially outwardly to engage the surface defining the first opening 30. The deforming of the tube 80 when received within the first opening 30 may be utilized to affix an axial position of the tube 80 relative to the first block 10.

Figure 9:
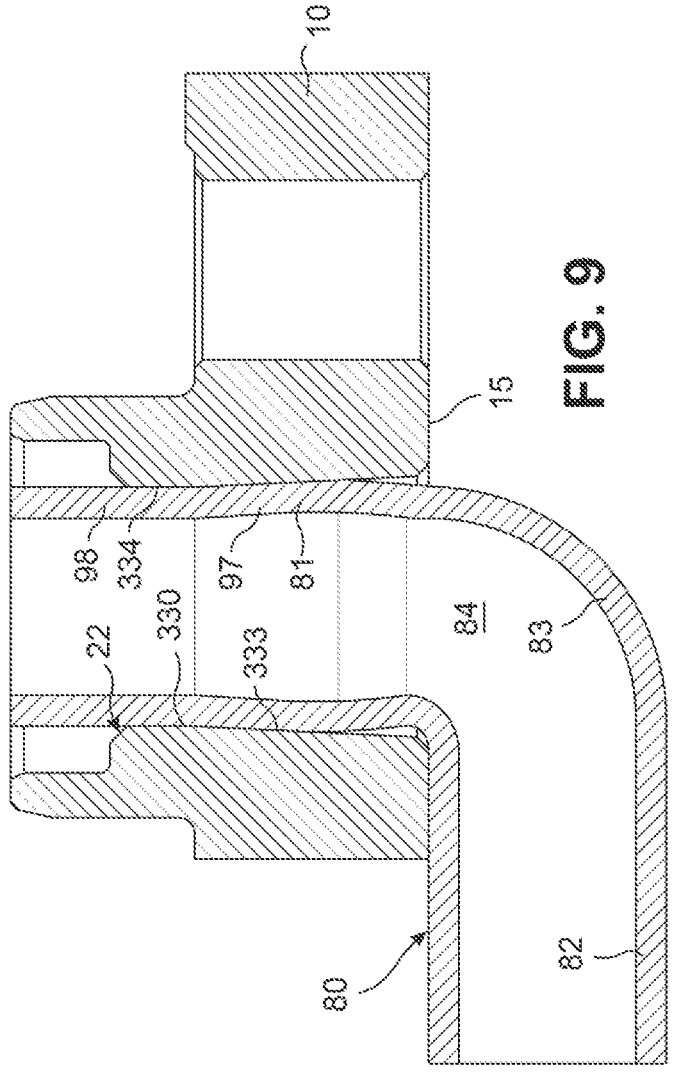
FIG. 9 is a cross-sectional elevational view of a modified first block and tube wherein the first segment of the tube is further deformed prior to entry into the first block according to another embodiment of the invention.

FIG. 9 illustrates one example wherein the axial length of the first segment 81 is deformed prior to reception within a modified first opening 330. The modified first opening 330 includes an inwardly tapering portion 333 adjacent the outer face 15 and an axially extending portion 334 adjacent the shoulder 22 of the first block 10. The first segment 81 of the tube 80 is deformed to similarly include an inwardly tapered portion 97 and an adjacent axially extending portion 98. The tapered portion 97 of the first segment 81 accordingly forms a stopping feature of the tube 80 during axial insertion of the first segment 81 into the first opening 330.

Figure 10:
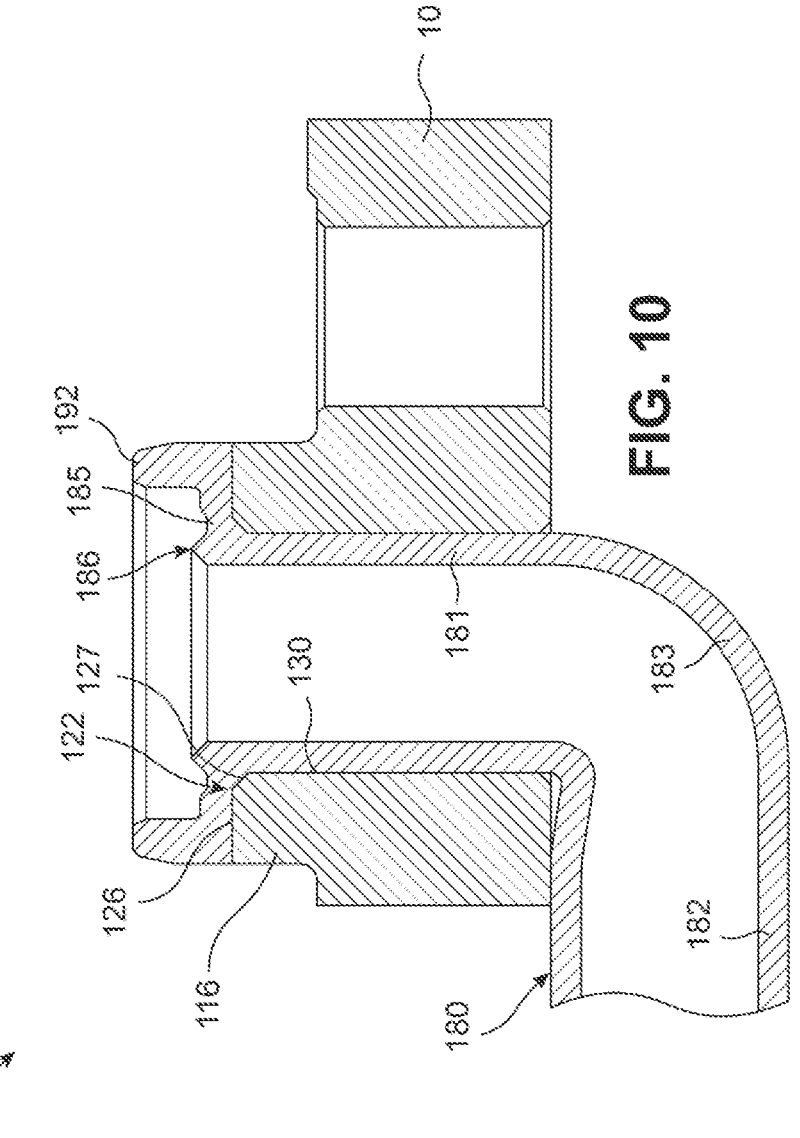
FIG. 10 is a cross-sectional elevational view of a block seal fitting assembly according to another embodiment of the invention.

Referring now to FIG. 10, a block assembly 101 according to another embodiment of the invention is disclosed. The block assembly 101 includes a first block 110 and a tube 180 that are each modified in comparison to the first block 10 and the tube 80 of the block assembly 1. The second block 40, the sealing element 60, and the fastener assembly 70 of the seal fitting assembly 101 are identical to those disclosed with regards to the block assembly 1, hence further description is omitted.

The first block 110 includes an annular projection 116 surrounding and partially defining a first opening 130 of the first block 110. The projection 116 includes a shoulder 122 formed by the cooperation of a radially extending surface 126 of the projection 116 and a surface of the first block 110 defining the first opening 130. The shoulder 122 may further include a chamfer 127 providing an annular frustoconical surface at the intersection of the radially extending surface 126 and the surface defining the first opening 130.

The tube 180 includes a first segment 181, a second segment 182 angled relative to the first segment 181, and a bend portion 183 connecting the first segment 181 to the second segment 182 in similar fashion to the tube 80 of the block assembly 1. The tube 180 is substantially identical to the tube 80 with the exception of a modification of an end portion of the first segment 181 configured to engage the projection 116 of the first block 110. The end portion of the first segment 181 is modified to define each of a seal engaging portion 185 and a piloting feature 192 of the first block 110. The seal engaging portion 185 extends radially outwardly to form a flanged portion of the tube 180 and the piloting portion 192 projects axially from a radial outermost portion of the seal engaging portion 185. The seal engaging portion 185 defines a seal engaging surface 186 of the tube 180 configured to engage the sealing element 60 when the first block 110 and the second block 40 are coupled to each other. The seal engaging surface 186 is disposed radially inwardly from the piloting feature 192 and includes each of the features described hereinabove with reference to the first seal engaging surface 86 of the tube 80 for applying the desired localized compressive forces to the sealing element 60. As shown by comparison of the block assembly 1 of FIG. 1 to the block assembly 101 of FIG. 10, the combination of the projection 116 and the tube 180 forms a male structural feature of the first block 110 having substantially the same shape and configuration as a male structural feature of the first block 10 formed by the combination of the projecting portion 16 and the tube 80.

The block assembly 101 operates in similar fashion to the block assembly 1. The first block 110 is drawn towards the second block 40 via use of the fastener assembly 70 to compress the sealing element 60 between the seal engaging surface 186 formed by the tube 180 and the seal engaging surface 56 formed by the second block 40.

The block assembly 101 is also manufactured using substantially the same process as described hereinabove with reference to the block assembly 1, except the formation of the piloting feature 192 in addition to the seal engaging portion 185 may require additional deforming and machining processes to be performed on the end portion of the first segment 181 following reception of the first segment 181 within the first opening 130. Furthermore, a greater length of the end portion of the first segment 181 may extend outside of the first opening 130 to accommodate the additional material used to form the piloting feature 192 of the tube 180.

Figure 11:
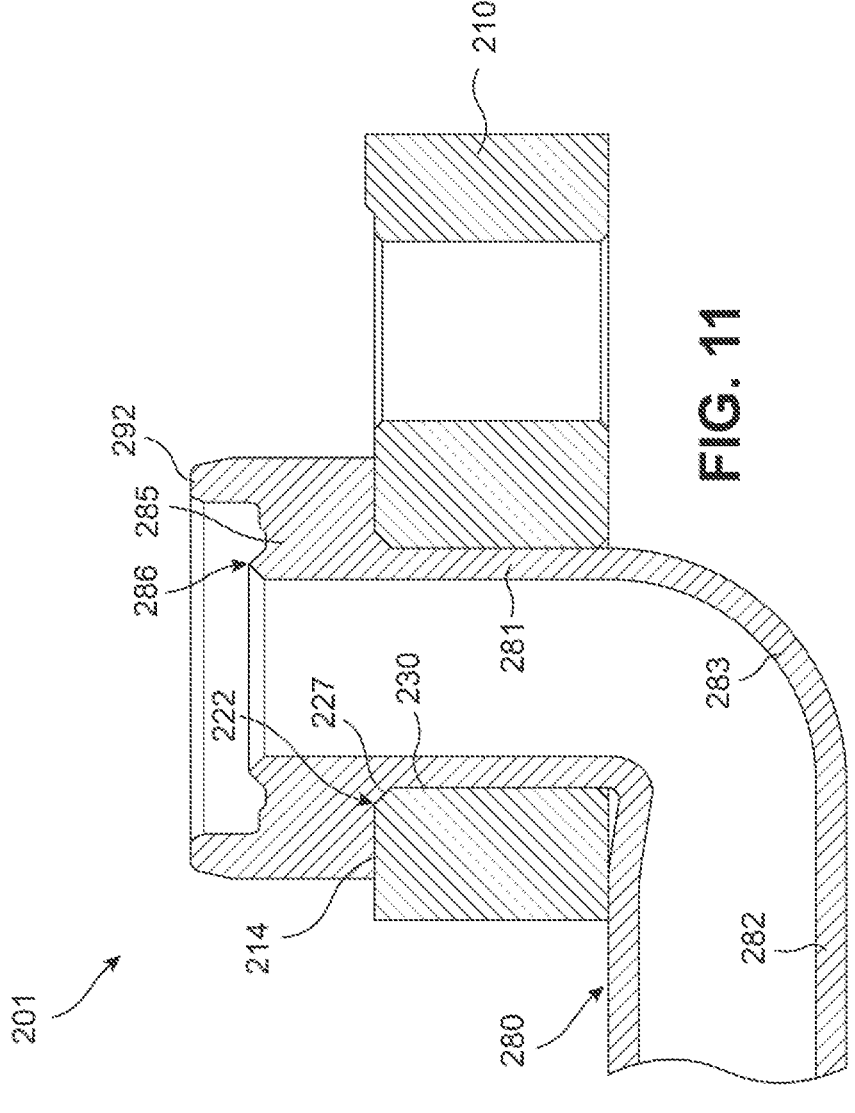
FIG. 11 is a cross-sectional elevational view of a block seal fitting assembly according to yet another embodiment of the invention.

FIG. 11 illustrates a first block 210 and a tube 280 of a block seal fitting assembly 201 according to yet another embodiment of the invention, wherein the first block 210 and the tube 280 are once again configured to cooperate with the second block 40, the sealing element 60, and the fastener assembly 70 as previously disclosed with reference to the block assembly 1 of FIGS. 1 and 4.

The first block 210 includes a first opening 230 extending axially therethrough. A shoulder 222 is formed at an intersection of a surface defining the first opening 230 and a substantially planar face 214 of the first block 210. The shoulder 222 may further include a chamfer 227 providing an annular frustoconical surface at the intersection of the planar face 214 and the surface defining the first opening 230. The tube 280 includes a first segment 281, a second segment 282 angled relative to the first segment 281, and a bend portion 283 connecting the first segment 281 to the second segment 282 in similar fashion to the tube 180 of the block assembly 101. An end portion of the first segment 281 is deformed radially outwardly to form each of a seal engaging portion 285 having a seal engaging surface 286 and an axially projecting piloting feature 292. The end portion of the first segment 281 is accordingly substantially similar to the end portion of the first segment 181 except for the increased axial length of the end portion of the tube 280 used to form the entirety of a projecting portion of the tube 280 for reception within the second recess 54 of the second block 40.

The tube 280 may once again be formed by substantially the same process as described with reference to the tubes 80, 180. However, as described with reference to the tube 180, the tube 280 may require a greater length of the first segment 281 thereof extended outside of the first opening 230 to accommodate the additional material used to form the projecting portion of the tube 280. Furthermore, it should be understood that additional deforming and machining steps may be required for forming the additional contours of the end portion of the tube 280, as desired.

One skilled in the art should appreciate that the block assemblies 101, 201 may be adapted or modified to include any of the shown or described features described hereinabove with reference to the block assembly 1, as desired, without departing from the scope of the present invention.

The block seal fitting assemblies disclosed herein provide numerous benefits including improving an ease of assembly and an ease of packaging of each of the block seal fitting assemblies due to increased compactness and reduced weight of each of the block seal fitting assemblies. The disclosed structures also reduce the manufacturing cost for producing each of the block seal fitting assemblies while improving the sealing capability of each of the block seal fitting assemblies. The use of a smooth and substantially circular flow opening along a length of each of the disclosed tubes reduces a pressure drop experienced by the corresponding fluid when passing through each of the disclosed tubes. The various different tube configurations also allow for the avoidance of aggressive coupling methods at each joint of each of the block seal fitting assemblies. The disclosed configurations also improve an ability to compensate for distortion created by the block to tube joining process while also improving a tube retention capability of each of the block seal fitting assemblies due to the structure of each of the outwardly deformed tube portions.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A block seal fitting assembly, comprising:
a first block having a first opening formed therethrough;
a sealing element; and
a tube including a first segment extending through the first opening of the first block, a second segment arranged at an angle relative to the first segment and a bend portion connecting the first segment to the second segment,
wherein an end portion of the first segment forms a seal engaging portion having a seal engaging surface of the tube engaging the sealing element,
wherein the first block includes a radially extending surface extended radially inwardly towards the first opening and a chamfer forming a frustoconical surface for connecting the radially extending surface to the first opening,
wherein the seal engaging surface includes an axially projecting engaging feature configured to engage the sealing element,
wherein the axially projecting engaging feature including a pointed edge formed at a distal end of the axially projecting engaging feature, wherein a diameter of the pointed edge is smaller than a diameter of the first opening, wherein the seal engaging portion is supported on the radially extending surface of the first block, wherein the second segment of the tube is supported on an outer face of the first block, which is a side opposite to the radially extending surface of the first block, and wherein the bend portion of the tube is spaced apart from the outer face of the first block.

\* \* \* \* \*